United States Patent
Bangalore Srinivas et al.

(10) Patent No.: US 12,005,737 B2
(45) Date of Patent: Jun. 11, 2024

(54) CHANGEABLE WHEEL TRACK MECHANISM FOR TRACK WIDTH ADJUSTMENT

(71) Applicant: Tata Consultancy Services Limited, Mumbai (IN)

(72) Inventors: Venkatesh Prasad Bangalore Srinivas, Bangalore (IN); Venkat Raju Chintalapalli Patta, Bangalore (IN); Raghav Ponnath, Bangalore (IN); Sreehari Kumar Bhogineni, Bangalore (IN); Prakash Chanderlal Ambwani, Gurgaon (IN); Rajesh Sinha, Noida (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 88 days.

(21) Appl. No.: 17/992,066

(22) Filed: Nov. 22, 2022

(65) Prior Publication Data

US 2023/0286319 A1    Sep. 14, 2023

(30) Foreign Application Priority Data

Mar. 10, 2022 (IN) .............................. 202221012936

(51) Int. Cl.
  *B60B 35/10* (2006.01)
(52) U.S. Cl.
  CPC ...... *B60B 35/1045* (2013.01); *B60B 35/1081* (2013.01)
(58) Field of Classification Search
  CPC ... B60B 35/1045; B60B 33/025; B60B 33/04; B60B 35/10; B60G 2200/44; B60G 2300/40; B60G 2200/10; B62D 5/00
  See application file for complete search history.

(56) References Cited

U.S. PATENT DOCUMENTS 6,206,126 B1   3/2001  Thiermann et al.
6,715,576 B2   4/2004  Filho
(Continued)

FOREIGN PATENT DOCUMENTS

CN       211663015 U  * 10/2020  ............. B60G 11/00
WO  WO-2021175042 A1 *  9/2021  ............. B60G 11/00

OTHER PUBLICATIONS

Gao, WO-2021175042-A1, Machine Translation of Specification (Year: 2021).*

(Continued)

*Primary Examiner* — Amy R Weisberg
*Assistant Examiner* — Matthew Joseph Ganci
(74) *Attorney, Agent, or Firm* — FINNEGAN, HENDERSON, FARABOW, GARRETT & DUNNER, LLP (57) ABSTRACT

State of the art track width adjustment mechanism fail to support track width adjustment while vehicle is in motion. They also require manual intervention, which causes inconvenience. The disclosure herein generally relates to wheel track adjustment, and, more particularly, to a changeable wheel track mechanism for track width adjustment (referred to as TWA mechanism). The TWA mechanism includes a steer and drive unit, a plurality of links, and a sliding unit. The TWA mechanism allows movement of a wheel in inward and outward directions, causing the track width adjustment. The track width is achieved by changing the wheel position to be at a wider position, or a narrower position, or any intermediate position. The TWA mechanism may be associated with any vehicle for which the track width adjustment is to be achieved.

5 Claims, 9 Drawing Sheets

(56) References Cited

U.S. PATENT DOCUMENTS 7,464,947 B2    12/2008   Cortese
9,452,763 B2     9/2016   Maeyama et al.

OTHER PUBLICATIONS

Gao, CN-211663015-U, Machine Translation of Specification (Year: 2020).*

* cited by examiner

CHANGEABLE WHEEL TRACK MECHANISM FOR TRACK WIDTH ADJUSTMENT

PRIORITY CLAIM

This U.S. patent application claims priority under 35 U.S.C. § 119 to: Indian Patent Application No. 202221012936, filed on Mar. 10, 2022. The entire contents of the aforementioned application are incorporated herein by reference.

TECHNICAL FIELD

The disclosure herein generally relates to wheel track adjustment, and, more particularly, to a changeable wheel track mechanism for track width adjustment.

BACKGROUND

In many situations, a vehicle may have to travel in tracks/paths having different width, and different parts of same track may have different widths. For example, consider vehicles being used in an agricultural field, for cultivation, harvesting, and other purposes. The tracks (or crop lanes) in such agricultural fields may be unpaved, and may have varied widths. The vehicles must be equipped to travel through these paths. Typically wider wheel track is preferred for better stability, while narrow wheel tracks are preferred while driving through narrow tracks. Also, when the vehicle has to move from one lane to another, it is desirable that the vehicle has least amount of turning radius or ability to move cross wise, so that maneuvering can be easily done in tighter spaces without having to waste more of.

Many state of the art vehicles do not have track width adjustment. They come with single track width. If such vehicles are used in agricultural fields where there is a scope to change crops which need different crop to crop spacings then there is a lot of crop space utilization with single wheel track. Another reason such agricultural vehicles may need to be carried on road for longer distance on Sports utility Vehicle (SUV) type trucks which is when it may be required to reduce the track width for the vehicle to fit in the trunk space of the truck. All these are not typically seen in the existing vehicles.

SUMMARY

Embodiments of the present disclosure present technological improvements as solutions to one or more of the above-mentioned technical problems recognized by the inventors in conventional systems. For example, in one embodiment, a track width adjustment (TWA) mechanism is provided. The TWA comprises a steer and drive unit, a plurality of links comprising an upper set of links and a lower set of links, and a sliding unit. The steer and drive unit comprises a bevel gear housing, wherein the bevel gear housing is configured to accommodate a first bevel gear and a second bevel gear which provide connection between two shafts which lie at a pre-defined angle to each other for transmission of motion and force, wherein the first bevel gear and the second bevel gear are connected at a predefined angle to each other, and a shaft end of the first bevel gear is connected to a motor and a shaft end of the second bevel gear is connected to a wheel bracket, forming a gear train. The steer and drive unit further comprises the motor, wherein the motor is mounted on a support provided on a first outer face of the bevel gear housing, wherein the motor is connected to the first bevel gear and causes rotation of the first bevel gear, and wherein the gear train transmits motion and force from the motor through the first bevel gear and the second bevel gear to the wheel bracket, causing the wheel bracket to rotate which further causes a motorized wheel connected to the wheel bracket to rotate about the axis of the second bevel gear. The steer and drive unit further comprises a thrust bearing and a radial bearing, wherein the thrust bearing and the radial bearing are held at an intended position by a flange housing with one or more spacers.

In the plurality of links comprising the upper set of links and the lower set of links, a first end of each of the plurality of links is connected to the bevel gear housing and a second end of each of the plurality of links is connected to a sliding plate, wherein the plurality of links form a connection between the steer and drive unit and a sliding unit, wherein the plurality of links carry transfer of load between a chassis and the motorized wheel, wherein the lower set of links encompasses a slot for a suspension system that transmits the load to the suspension system, and wherein the upper set of links and the lower set of links pivot and rotate around a connection at the first end of the plurality of links. The second end of the plurality of links is connected to the bevel gear housing and the sliding plate respectively, wherein the rotation of the upper set of links and the lower set of links provides a coherent motion when the sliding plate moves in the first direction and the second direction vertically while the motorized wheel rolls inwards and outwards of the chassis respectively.

The sliding unit comprises the sliding plate, wherein a first end of the sliding plate is connected to the plurality of links and a second end of the sliding plate is mounted on a Linear Motion (LM) carriage, wherein the LM carriage slides over a plurality of LM rails mounted onto an attachment plate, wherein the attachment plate is configured for fixing and connecting the TWA mechanism with the chassis, wherein a back surface of the attachment plate is attached to the chassis, and wherein the attachment plate comprises a plurality of locating holes for connecting a spring-loaded plunger, wherein the spring-loaded plunger has a locking element with a pin, with an attached pull knob for adjusting position of the locking element, wherein when the pull knob of the spring-loaded plunger is in a first position, an opposite end of the spring-loaded plunger moves inside one of a plurality of holes in the attachment plate to constraint the motion of the sliding plate 103a, wherein when the pull knob of the spring-loaded plunger is in a second position the opposite end of the spring-loaded plunger 103c moves back and detaches from the hole, causing the sliding unit 103 to slide with motion of the plurality of links 102. The sliding unit further comprises a lead screw 103d, wherein the lead screw 103d is fixed at top end of the sliding unit 103 with a fixed nut 103g, wherein the lead screw 103d is configured to rotate on an associated axis, and wherein rotation of the lead screw causes (i) the sliding plate to move in a first direction and a second direction, (ii) movement of the plurality of links, and (iii) shift in the position of the motorized wheel.

In another aspect, In the TWA mechanism, an inward movement of the motorized wheel 104 is achieved by adjusting track width using the TWA mechanism. Achieving the inward movement is caused by the following steps. Initially the motorized wheel 104 is rotated at a pre-defined angle about the axis of the second bevel gear, using a motor-bevel gear configuration comprising the motor 101b, the first bevel gear, and the second bevel gear. Further, the attached pull knob of the spring-loaded plunger 103c is pulled on the first end and the second end of the sliding plate 103a, causing release of the spring-loaded plunger 103c from the hole in the attachment plate 103b with which the spring-loaded plunger 103c is connected, further causing the sliding plate 103a to move in a first direction with the motion of the plurality of links 102. The lead screw 103d is then rotated, causing the sliding plate 103a to slide in the first direction, wherein the motion of sliding plate 103a causes the motorized wheel 104 to rotate inwards, further causing the track width adjustment. The pull knob of the spring-loaded plunger 103c is then released, causing the spring-loaded plunger 103c to secure a connection with one of the plurality of holes attachment plate 103b, where the track width adjustment has achieved. Further, the motorized wheel is rotated clockwise by the pre-defined angle to regain a normal driving position.

In yet another aspect, In the TWA mechanism, an outward movement of the motorized wheel 104 is achieved by adjusting track width using the TWA mechanism, based on the following steps. The motorized wheel 104 is rotated at a pre-defined angle, using a motor-bevel gear configuration comprising the motor 101b, the first bevel gear, and the second bevel gear. Further, the attached pull knob of the spring-loaded plunger 103c is pulled on the first end and the second end of the sliding plate 103a, causing release of the spring-loaded plunger 103c from the hole in the attachment plate 103b with which the spring loaded plunger 103c is connected, further causing the sliding plate to move in a second direction with the motion of the plurality of links 102. The lead screw 103d is then rotated, causing the sliding plate 103a to slide in the second direction, wherein the motion of sliding plate causes the motorized wheel 104 to rotate outwards, further causing the track width adjustment. The attached pull knob of the spring-loaded plunger 103c is then released, causing the spring loaded plunger 103c to secure a connection with one of the plurality of holes attachment plate 103b, where the track width adjustment has achieved. Further, the motorized wheel is rotated clockwise at the pre-defined angle to regain a normal driving position.

In yet another aspect, in the TWA mechanism, the pre-defined angle causes the two shafts to lie at a right angle to each other.

In yet another aspect, in the TWA mechanism, the bevel gear arrangement is used to change orientation of the motorized wheel 104 and one or more other wheels in the TWA mechanism, causing movement of a vehicle attached with the TWA mechanism in any direction.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

To facilitate movement of vehicles in paths having varying width or in different paths having different width, it is important to have a width adjustment mechanism which allows to adjust track width. Many systems exist that are used for track width adjustment and each of them uses different approaches. Some of the existing approaches facilitate adjustment of track width of only one set of wheels i.e., front side or rear-side. Some other exiting approaches require manual adjustment and may not be very convenient. Another disadvantage of the existing approaches is that they may not support track width adjustment while the vehicle is in motion i.e., the vehicle has to come to a halt before the track width can be adjusted, which is inconvenient and affects movement of the vehicle.

Referring now to the drawings, and more particularly to FIG. 1 through FIG. 9C, where similar reference characters denote corresponding features consistently throughout the figures, there are shown preferred embodiments and these embodiments are described in the context of the following exemplary system and/or method.

Reference numerals of one or more components of the TWA as depicted in FIGS. 1 through 4B are provided in Table. 1 for ease of description.

TABLE 1

| S. No | Component | Reference numeral |
|---|---|---|
| 1 | Steer and drive unit | 101 |
| 2 | Links | 102 |
| 3 | Sliding unit | 103 |
| 4 | Bevel gears | 101f |
| 5 | Motor | 101b |
| 6 | Bevel gear housing | 101a |
| 7 | Thrust bearing | 101c |
| 8 | Radial Bearing | 101d |
| 9 | Spacers | 101e |
| 10 | Wheel bracket | 106 |
| 11 | Motorized wheel | 104 |
| 12 | Upper set of links | 102a |
| 13 | Lower set of links | 102b |
| 14 | Sliding plate | 103a |
| 15 | Attachment plate | 103b |
| 16 | Spring loaded plunger | 103c |
| 17 | Lead screw | 103d |
| 18 | Linear Motion (LM) Carriage | 103e |
| 19 | LM guide rail | 103f |
| 20 | Fixed nut | 103g |
| 21 | Locating holes for plunger attachment | 103h |
| 22 | Flange Bearing | 201 |
| 23 | Nut | 301 |
| 24 | Chassis | 401 |

Figure 1:
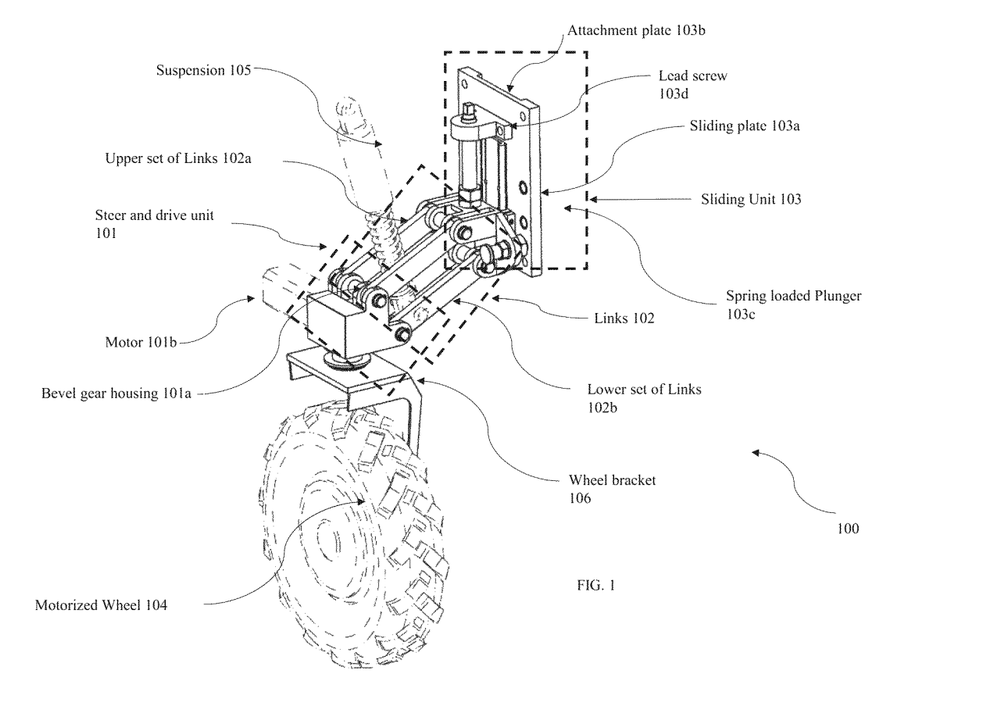
FIG. 1 illustrates an exemplary architecture of a Track Width Adjustment (TWA) mechanism, according to some embodiments of the present disclosure.
Figure 2:
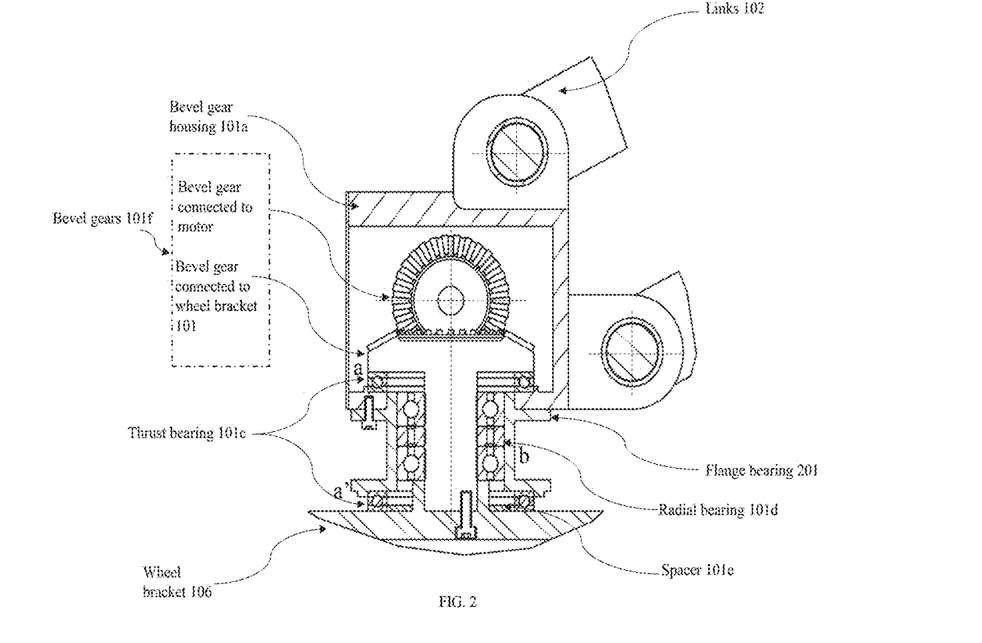
FIG. 2 is a sectional view of the TWA mechanism, according to some embodiments of the present disclosure.
Figure 3A:
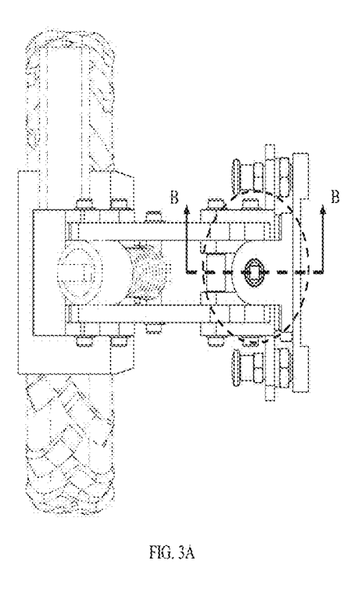
FIGS. 3A and 3B are top view and a detailed sectional view of the TWA mechanism, in accordance with some embodiments of the present disclosure.
Figure 3B:
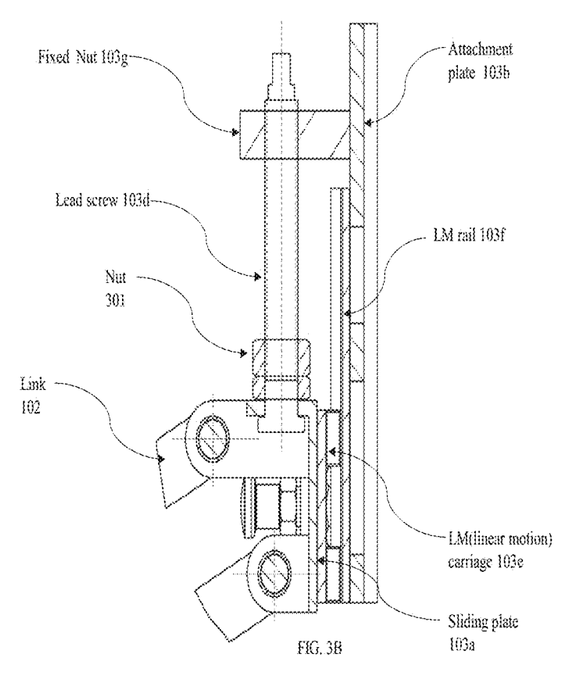
Figure 4A:
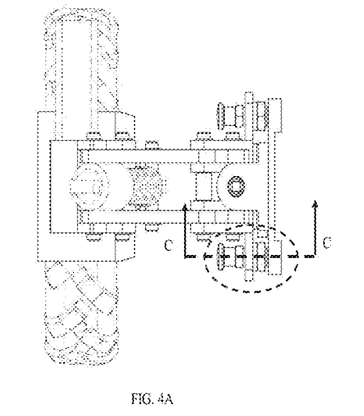
FIGS. 4A and 4B are yet another top view and detailed sectional view of the TWA mechanism, in accordance with some embodiments of the present disclosure.
Figure 4B:
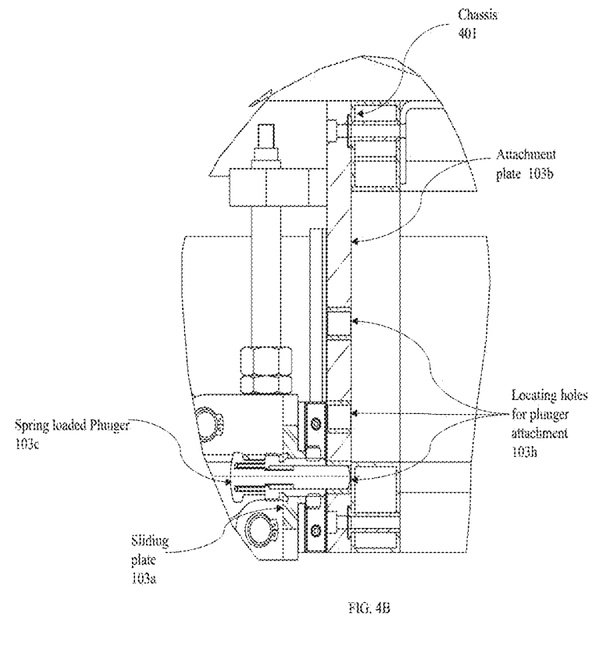

FIG. 1 illustrates an exemplary architecture of a Track Width Adjustment (TWA) mechanism, according to some embodiments of the present disclosure.

The Track Width Adjustment (TWA) mechanism for changeable wheel track consists of a steer and drive unit 101, a plurality of links 102, and a sliding unit 103. The steer and drive unit 101 further comprises of bevel gears 101f, a motor 101b, a bevel gear housing 101a, a thrust bearing 101c, a radial bearing 101d, a flange bearing 201, one or more spacers 101e, a motorized wheel 104, and a wheel bracket 106. The plurality of links 102 comprises an upper set of links 102a, and a lower set of links 102b. The sliding unit 103 further comprises of a sliding plate 103a, an attachment plate 103b, a spring-loaded plunger 103c, a lead screw 103d, a Linear Motion (LM) carriage 103e, a Linear Motion (LM) guide rail 103f, and a fixed nut 103g.

The bevel gear housing 101a is configured to provide housing for the bevel gears 101f i.e., to a first bevel gear and a second bevel gear, provide connection between two shafts which lie at a pre-determined angle (for example, at right angle to each other) for transmission of motion and force. On a first outer face of the bevel gear housing 101a, a support for the motor 101b is provided, wherein the motor 101b is connected to the first bevel gear and is responsible for the rotation of the bevel gears 101f. The first bevel gear is connected to the second bevel gear at a pre-defined angle (for example, at right angle to each other) and a shaft end of the second bevel gear is connected to the wheel bracket 106. This arrangement of the bevel gears 101f and the associated shafts form a gear train for transmission of motion and force from the motor 101b through the bevel gears 101f to wheel bracket 106 and in turn to the motorized wheel 104. This helps in the rotation of the motorized wheel allowing the vehicle to maneuver in any direction as maybe required.

The thrust bearing 101c, the radial bearing 101d, and the spacers 101e are utilized for smooth transmission of weight and force from the bevel gears 101f to the wheel bracket 106. The thrust bearing 101c is used at two different positions as depicted in the cross sectional view in FIG. 2. For explanation purpose the two positions are denoted as a and a'. In this arrangement, the thrust bearing 101c allows efficient transfer of the axial load coming from the motorized wheel 104 to chassis 401 of the vehicle and vice versa.

The thrust bearings 101c at the positions a and a', while the radial bearing at position b (depicted in FIG. 2) allows the bevel gear 101f to rotate smoothly. The spacers 101e and the flange bearing 201 are provided to hold the thrust and radial bearings at intended positions. A drive (hub) motor (not shown in figure) may be used to enable rotation of the motorized wheel 104. Steering of the motorized wheel 104 is controlled by the motor 101b, when the motor 101b rotates the gear train transmits the motion and rotates the wheel bracket 106 and in turn the motorized wheel 104 to a desired position.

The plurality of links 102 act as connection between the sliding unit 103 and the steer and drive unit 101. The plurality of links 102 is arranged in two sets i.e., an upper set of links 102a and a lower set of links 102b. Though in the figures total 4 links are depicted, this is for explanation purpose only, and the number of links may vary as per requirements. One end of the links 102 is connected to the bevel gear housing 101a and the other end of the links 102 is connected to the sliding unit 103.

The links 102 are configured to handle transmission of load from the chassis 401 to the motorized wheel 104 and vice-versa. The lower set links 102b also encompasses a slot for a suspension system, which is responsible for the transmission of load to the suspension system attached. This further enables the vehicle to move smoothly while going over a bumpy road (or track or pathway). The plurality of links 102 may utilize a 4-bar mechanism for motion. The upper set of links 102a and the lower set of links 102b are designed to be of equal lengths so that the sliding plate 103a moves coherently with the motion of the motorized wheel 104 while coming towards and moving outwards of the chassis 401. The lengths of the links 102 can be changed according to the specifications of the customer.

The sliding plate 103a of the sliding unit 103 has the plurality of links 102 connected at one end and the other end is mounted on the LM carriage 103e. The LM carriage 103e slides over the LM guide rails (alternately referred to as 'LM rails') 103f which are mounted onto the attachment plate 103b. The attachment plate 103b is a solid and sturdy plate which is responsible for fixing and connecting with the chassis 401 of the vehicle. The attachment plate 103b is connected at all of its 4 ends to the chassis 401, making it very rigid. The attachment plate 103b also consists of several locating holes for the spring loaded plunger 103c. The motion of the links 102 triggers the motion of the sliding plate 103a, while on the either side of the sliding plate 103a the spring loaded plunger 103c is attached. The spring loaded plunger 103c is a locking element with a bolt, and is commonly used for positioning and fixing. The spring loaded plunger 103c has a pull knob (alternately referred as 'knob') attached to it. The spring loaded plunger 103c is attached such that in it's normal position (when the end n (knob) of the spring loaded plunger 103c is not pulled) the end n' moves inside a hole provided in the attachment plate 103b. There are several locating holes on the attachment plate 103b, provided one above the other, for the fixation of the spring loaded plunger 103c, and this in turn supports adjustment of the track width at different stages/positions between the wider position and the narrower position. The positions/stages between the wider position and the narrower position are also referred to as intermediate stages/positions. When the spring loaded plunger 103c is inside one of the locating holes, the sliding unit 103 is totally fixed and held firmly that refrains it from movement irrespective of the motion of the links 102.

Whenever the knob (end n) of the spring loaded plunger 103c is pulled, the end n (moving end) of the spring loaded plunger 103c moves back and thereby detaches itself from the hole. This allows the sliding unit 103 to slide with the motion of the links 102.

Figure 8A:
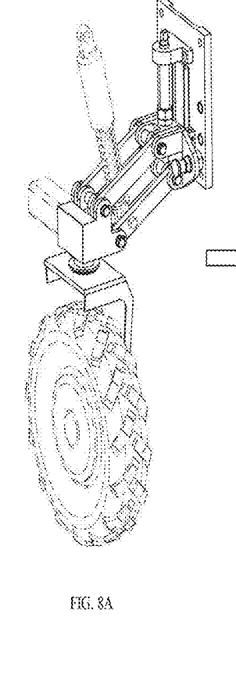
FIGS. 8A through 8C illustrate transition of wheels from the widened position to the narrow position, in the 4 wheeled vehicle, using the TWA mechanism, in accordance with some embodiments of the present disclosure.
Figure 8B:
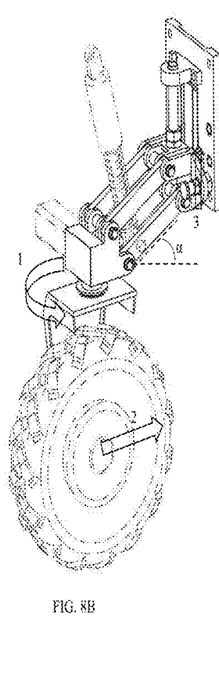
Figure 8C:
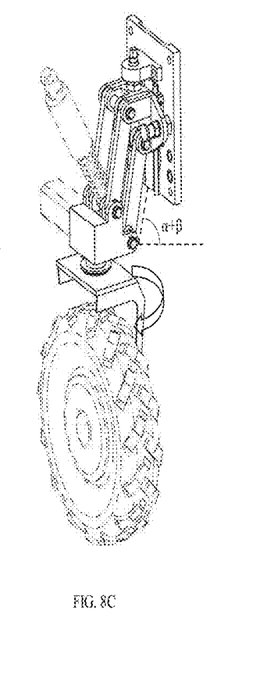

The lead screw 103d of the sliding unit 103 is fixed at the top end with the nut 301, so the lead screw 103d is free to rotate on its own axis. The nut 301 secures position of the lead screw 103d to the sliding plate. The lead screw 103d passes through the sliding plate 103a, and external threads on the lead screw 103d engage with internal thread on the sliding plate 103a. When the lead screw 103d is rotated externally the sliding plate 103a moves in a first direction, which in turn moves the links 102. In an embodiment, the first direction is u[ward direction. The motion of the links 102 shifts the position of the motorized wheel 104 inwards or outwards to achieve the track width adjustment, as depicted in FIGS. 8A through 8C.

Figure 5A:
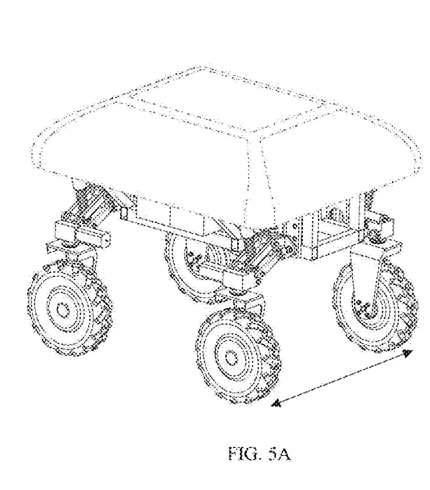
FIGS. 5A and 5B illustrate isometric views of a 4 wheeled vehicle with the TWA mechanism installed, with the wheels in widened position and narrow position, respectively, in accordance with some embodiments of the present disclosure.
Figure 5B:
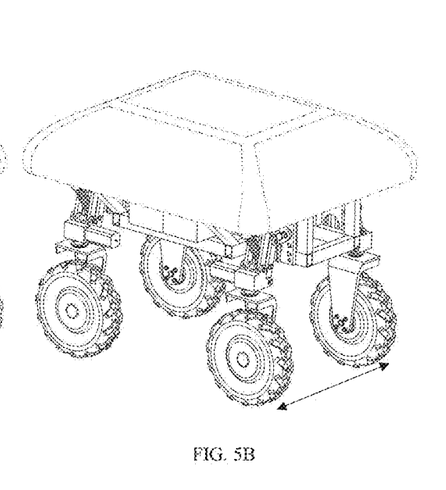
Figure 6A:
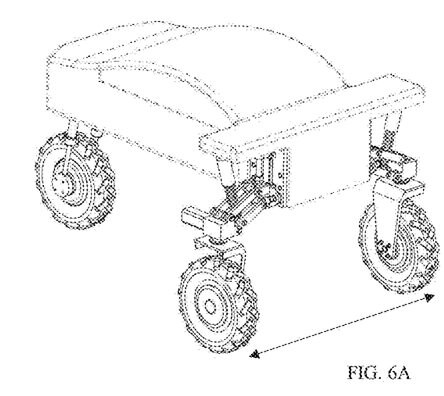
FIGS. 6A and 6B illustrate isometric views of a 3 wheeled vehicle with the TWA mechanism installed, with the wheels in widened position and narrow position, respectively, in accordance with some embodiments of the present disclosure.
Figure 6B:
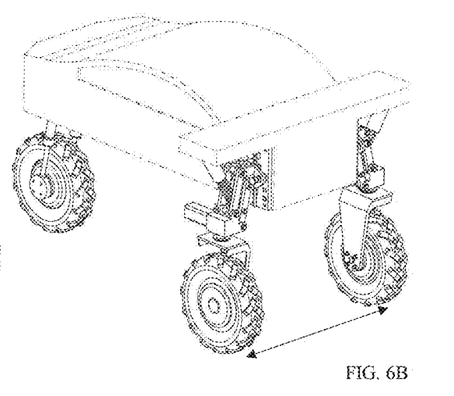
Figure 7A:
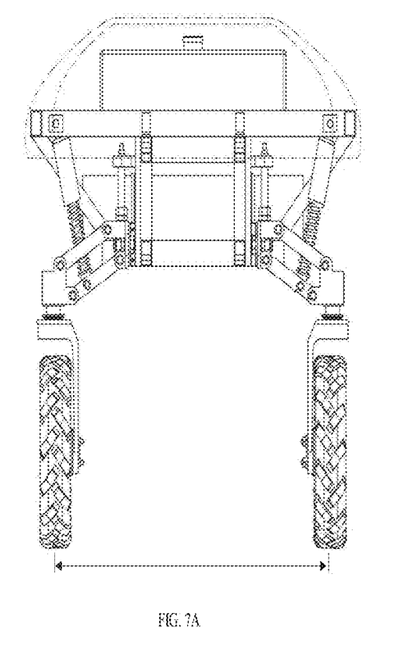
FIGS. 7A and 7B illustrate front views of the 4 wheeled vehicle with the wheels in widened position and narrow position, respectively, in accordance with some embodiments of the present disclosure.
Figure 7B:
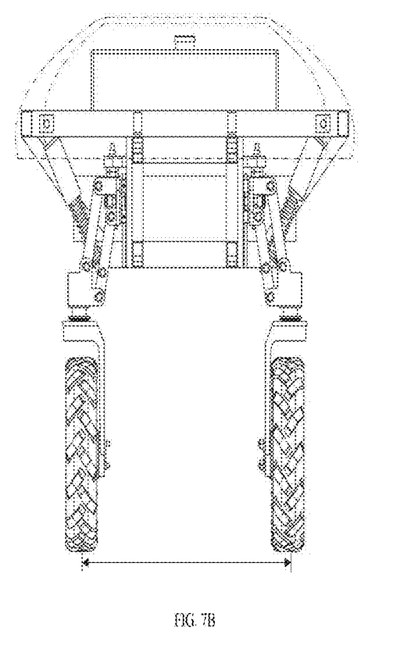

The aforementioned architecture details of the TWA mechanism are depicted in FIGS. 1 through 4B. It is to be noted that working of the TWA mechanism is explained with reference to only one motorized wheel 104. However, it is to be noted that the TWA mechanism can be connected to any number of wheels of the vehicle, thereby achieving inward and outward movement of all intended wheels, to achieve the track width adjustment. For example, as in FIGS. 6A and 6B, when the TWA mechanism is used with a 3-wheeled vehicle, the TWA mechanism can be used to cause the inward and outward movement of one or both the wheels on the end where two wheels are present, causing the track width adjustment. FIG. 6A depicts the wheels in a wider position, whereas FIG. 6B depicts the wheels in a narrower position, i.e., after performing the track width adjustment. Likewise the tire width may be adjusted from narrow to wider, using the track width adjustment mechanism. In another example, as in FIGS. 5A and 5B, when the TWA mechanism is used with a 4-wheeled vehicle, the TWA mechanism can be used to cause the inward and outward movement of one or both the wheels on either ends of the vehicle, causing the track width adjustment. FIG. 5A depicts the wheels in a wider position, whereas FIG. 5B depicts the wheels in a narrower position, i.e., after performing the track width adjustment. Likewise the tire width may be adjusted from narrow to wider, using the track width adjustment mechanism.

Working of the TWA mechanism to achieve the track width adjustment is now explained with reference to FIGS. 7A through 8C. Consider that the tires are initially in the wider position (most outspread position) as in FIG. 7A. To change the position of the tires to the inward/narrow position, the motorized wheel 104 is initially rotated by a pre-defined angle (for example 90 degrees) with help of motor-bevel gear configuration, as in FIGS. 8A and 8B. Further, the knob of the spring loaded plunger 103c is pulled on the either end of the sliding plate 103a, releasing the spring loaded plunger 103c from the locating hole on the attachment plate 103b. This allows the sliding plate 103a to move in a first direction and a second direction with the motion of the links. Further, the lead screw 103d is externally rotated causing the sliding plate 103a to slide in the first direction. This motion of sliding plate 103a causes the motorized wheel 104 to rotate inwards. The knob of the spring loaded plunger 103c is then released, which allows the spring loaded plunger 103c to secure a connection with a desired locating hole on the attachment plate 103b. These adjustments are depicted in FIGS. 8B and 8C. Further, the wheel is rotated clockwise by the pre-defined angle (for example, 90 degrees) to regain its normal driving position, as in FIG. 8C. During this process a link angle changes from $\alpha$ to $\alpha+\beta$, providing a desired configuration for the wheel track. Likewise the lead screw 103d is externally rotated causing the sliding plate 103a to slide in a second direction, causing the motorized wheel 104 to rotate outwards. In an embodiment, the second direction is downward direction. The knob of the spring loaded plunger 103c is then released, which allows the spring loaded plunger 103c to secure a connection with a desired locating hole on the attachment plate 103b. This way the track width adjustment is done to cause the wheels to move from the inward position to the outward position. Further, the wheel is rotated clockwise by the pre-defined angle (for example, 90 degrees) to regain its normal driving position.

Figure 9A:
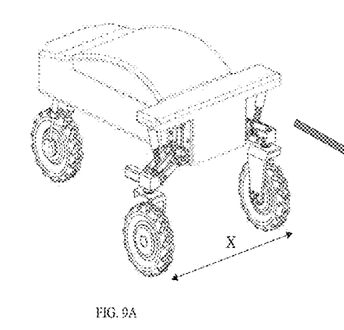
FIGS. 9A through 9C illustrate transition of wheels from the widened position to the narrow position, in the 4 wheeled vehicle, using the TWA mechanism, in accordance with some embodiments of the present disclosure.
Figure 9B:
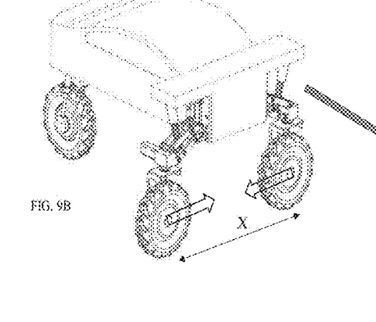
Figure 9C:
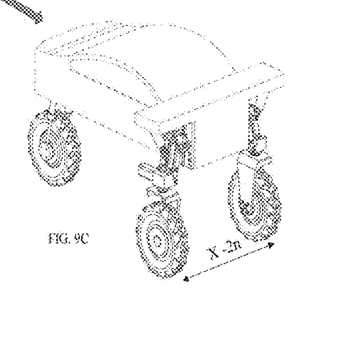

The track width adjustment is depicted in FIGS. 9A through 9C as well. In FIG. 9A, the two wheels at same end of a 3-wheeled vehicle are in wider position. In FIG. 9B, the wheels are rotated by a pre-defined angle (for example, 90 degrees) and move inwards, while the spring loaded plunger moves and secures a connection with a desired locating hole on the attachment plate 103b. After adjusting the track width as intended, the wheels are again rotated as in FIG. 9C, to facilitate further movement of the vehicle. As in FIG. 9A, initial distance between the wheels is X, and after the track width adjustment, the distance between the wheels is X−2n, where 'n' is distance moved by each wheel.

Use of the TWA mechanism is explained with reference to vehicles used for agricultural purposes. However, it is to be noted that this is not intended to limit scope of the method and system disclosed herein in any manner, and is for explanation purpose only. The TWA mechanism may be used for track width adjustments of vehicles used in other domains as well, such as but not limited to industrial applications, and user/goods transport, as required. The TWA mechanism by maybe attached/associated with the vehicle for which the track width adjustment is to be achieved.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of track width adjustment of vehicles. The embodiment, thus provides a mechanism to adjust position of wheels in inward or outward directions to adjust track width.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope of disclosed embodiments being indicated by the following claims.

What is claimed is:

1. A track width adjustment (TWA) mechanism, comprising:
    a steer and drive unit, wherein the steer and drive unit comprises:
        a bevel gear housing, wherein the bevel gear housing is configured to accommodate a first bevel gear and a second bevel gear which provide connection between two shafts which lie at a pre-defined angle to each other for transmission of motion and force, wherein the first bevel gear and the second bevel gear are connected at a predefined angle to each other, and a shaft end of the first bevel gear is connected to a motor and a shaft end of the second bevel gear is connected to a wheel bracket, forming a gear train;
        the motor, wherein the motor is mounted on a support provided on a first outer face of the bevel gear housing, wherein the motor is connected to the first bevel gear and causes rotation of the first bevel gear, and wherein the gear train transmits motion and force from the motor through the first bevel gear and the second bevel gear to the wheel bracket, causing the wheel bracket to rotate which further causes a motorized wheel connected to the wheel bracket to rotate about the axis of the second bevel gear; and
        a thrust bearing and a radial bearing, wherein the thrust bearing and the radial bearing are held at an intended position by a flange housing with one or more spacers;
    a plurality of links comprising an upper set of links and a lower set of links, wherein,
        a first end of each of the plurality of links is connected to the bevel gear housing and a second end of each of the plurality of links is connected to a sliding plate, wherein the plurality of links form a connection between the steer and drive unit and a sliding unit, wherein the plurality of links carry transfer of load between a chassis and the motorized wheel,
        wherein the lower set of links encompasses a slot for a suspension system that transmits the load to the suspension system, and
        wherein the upper set of links and the lower set of links pivot and rotate around a connection at the first end of the plurality of links, and
        the second end of each of the plurality of links which is connected to the bevel gear housing and the sliding plate respectively, wherein the rotation of the upper set of links and the lower set of links provides a coherent motion when the sliding plate moves in the first direction and the second direction vertically while the motorized wheel rolls inwards and outwards of the chassis respectively,
    wherein the sliding unit comprises:
        the sliding plate, wherein a first end of the sliding plate is connected to the plurality of links and a second end of the sliding plate is mounted on a Linear Motion (LM) carriage, wherein the LM carriage slides over a plurality of LM rails mounted onto an attachment plate,
        wherein the attachment plate is configured for fixing and connecting the TWA mechanism with the chassis, wherein a back surface of the attachment plate is attached to the chassis, wherein the attachment plate comprises a plurality of locating holes for connecting a spring-loaded plunger, and wherein the spring-loaded plunger has a locking element with a pin with an attached pull knob for adjusting position of the locking element, wherein when the attached pull knob of the spring-loaded plunger is in a first position, an opposite end of the spring-loaded plunger moves inside one of a plurality of holes in the attachment plate to constraint the motion of the sliding plate,
        wherein when the pull knob of the spring-loaded plunger is in a second position the opposite end of the spring-loaded plunger moves back and detaches from the hole, causing the sliding unit to slide with motion of the plurality of links; and
        a lead screw, wherein the lead screw is fixed at top end of the sliding unit with a fixed nut, wherein the lead screw is configured to rotate on an associated axis, wherein rotation of the lead screw causes (i) the sliding plate to move in a first direction and a second direction, (ii) movement of the plurality of links, and (iii) shift in the position of the motorized wheel.

2. The TWA mechanism as claimed in claim 1, wherein an inward movement of the motorized wheel is achieved by adjusting track width using the TWA mechanism, comprises:
    rotating the motorized wheel at a pre-defined angle about the axis of the second bevel gear, using a motor-bevel gear configuration comprising the motor, the first bevel gear, and the second bevel gear;
    pulling the attached pull knob of the spring-loaded plunger on the first end and the second end of the sliding plate, causing release of the spring-loaded plunger from the hole in the attachment plate with which the spring-loaded plunger is connected, further causing the sliding plate to move in a first direction in with the motion of the plurality of links;
    rotating the lead screw causing the sliding plate to slide in the first direction, wherein the motion of sliding plate causes the motorized wheel to rotate inwards, further causing the track width adjustment; releasing the attached pull knob of the spring-loaded plunger, causing the spring-loaded plunger to secure a connection with one of the plurality of holes in the attachment plate, where the track width adjustment has achieved; and
    rotating the motorized wheel clockwise by the pre-defined angle to regain a normal driving position.

3. The TWA mechanism as claimed in claim 1, wherein an outward movement of the motorized wheel is achieved by adjusting track width using the TWA mechanism, comprises:
    rotating the motorized wheel at a pre-defined angle, using a motor-bevel gear configuration comprising the motor, the first bevel gear, and the second bevel gear;

pulling the attached pull knob of the spring-loaded plunger on the first end and the second end of the sliding plate, causing release of the spring-loaded plunger from the hole in the attachment plate with which the spring-loaded plunger is connected, further causing the sliding plate to move in a second direction with the motion of the plurality of links;

rotating the lead screw causing the sliding plate to slide in the second direction, wherein the motion of sliding plate causes the motorized wheel to rotate outwards, further causing the track width adjustment; releasing the attached pull knob of the spring-loaded plunger, causing the spring loaded plunger to secure a connection with one of the plurality of holes attachment plate, where the track width adjustment has achieved; and rotating the motorized wheel clockwise at the pre-defined angle to regain a normal driving position.

4. The TWA mechanism as claimed in claim 1, wherein the pre-defined angle causes the two shafts to lie at a right angle to each other.

5. The TWA mechanism as claimed in claim 1, wherein the bevel gear arrangement is used to change orientation of the motorized wheel and one or more other wheels in the TWA mechanism, causing movement of a vehicle attached with the TWA mechanism in any direction.

* * * * *